(12) United States Patent
Schweinert

(10) Patent No.: US 10,454,329 B2
(45) Date of Patent: Oct. 22, 2019

(54) ELECTRICAL HOLLOW CONDUCTOR FOR AN ELECTROMAGNETIC MACHINE

(71) Applicant: DYNAMIC E FLOW GMBH, Kaufbeuren (DE)

(72) Inventor: Nikolaus Schweinert, Kaufbeuren (DE)

(73) Assignee: DYNAMIC E FLOW GMBH, Kaufbeuren (DE)

(*) Notice: Subject to any disclaimer, the term of this patent is extended or adjusted under 35 U.S.C. 154(b) by 483 days.

(21) Appl. No.: 15/300,457

(22) PCT Filed: Apr. 2, 2015

(86) PCT No.: PCT/EP2015/057400
§ 371 (c)(1),
(2) Date: Sep. 29, 2016

(87) PCT Pub. No.: WO2015/150556
PCT Pub. Date: Oct. 8, 2015

(65) Prior Publication Data
US 2017/0126084 A1    May 4, 2017

(30) Foreign Application Priority Data

Apr. 4, 2014   (DE) .................. 10 2014 104 817
May 7, 2014   (DE) .................. 10 2014 006 656
Oct. 20, 2014  (DE) .................. 10 2014 015 564

(51) Int. Cl.
*H02K 3/22*    (2006.01)
*H02K 3/24*    (2006.01)
(Continued)

(52) U.S. Cl.
CPC .............. *H02K 3/22* (2013.01); *H02K 9/193* (2013.01)

(58) Field of Classification Search
CPC .................................. H02K 3/22; H02K 3/24
See application file for complete search history.

(56) References Cited

U.S. PATENT DOCUMENTS

| 1,128,194 A | 2/1915 | Smither |
| 3,014,139 A | 12/1961 | Shildneck |

(Continued)

FOREIGN PATENT DOCUMENTS

| DE | 1247458 | 8/1967 |
| EP | 0175083 A1 | 3/1986 |

(Continued)

OTHER PUBLICATIONS

Z. Wen et al.: "Optimum Design of Hollow Conductor in Stator Winding for Large Evaporative Hydro-generator", 2006 5th International Power Electronics and Motion Control Conference, vol. 1, Jan. 1, 2006, pp. 1-4.

(Continued)

*Primary Examiner* — Edgardo San Martin
(74) *Attorney, Agent, or Firm* — Carter, DeLuca & Farrell LLP

(57) ABSTRACT

An electrical hollow conductor (1) in the shape of a tubular body (2) having a hollow interior (3) for continuously winding an electromagnetic coil, wherein the body (2) comprises an electrically conductive material, has an outside diameter and an inside diameter, wherein a ratio of the outside diameter to the inside diameter is in a range of 1.25:1 to 4:1, and is coated with an electrically insulating layer (4) on an outer casing surface of the body (2) and wherein the interior (3) is configured so that it hydraulically or pneumatically connects a first open end of the body (2) and a second open end of the body (2).

7 Claims, 8 Drawing Sheets

(51) Int. Cl.
  H01B 7/42   (2006.01)
  H02K 9/193  (2006.01)
  H02K 3/04   (2006.01)

(56) References Cited

U.S. PATENT DOCUMENTS

| | | | |
|---|---|---|---|
| 3,034,003 A | 5/1962 | Seidner | |
| 3,112,415 A * | 11/1963 | Bahn | H02K 3/22 310/54 |
| 3,395,299 A * | 7/1968 | Quay | H02K 1/265 310/214 |
| 3,469,125 A | 9/1969 | Kranz | |
| 3,497,737 A | 2/1970 | Philofsky | |
| 3,614,493 A * | 10/1971 | Collings | H02K 3/22 310/54 |
| 3,634,705 A * | 1/1972 | Fidei | H02K 3/22 310/57 |
| 3,955,110 A | 5/1976 | Karlen | |
| 4,056,880 A * | 11/1977 | Stewart | H02K 3/24 228/140 |
| 4,133,559 A | 1/1979 | Davies | |
| 4,199,700 A | 4/1980 | Daugherty et al. | |
| 4,258,939 A * | 3/1981 | Karlen | H02K 9/005 174/15.6 |
| 4,274,021 A * | 6/1981 | Kamiya | H02K 3/22 310/260 |
| 4,375,823 A | 3/1983 | Zerlik | |
| 4,629,917 A * | 12/1986 | Brem | H02K 3/22 310/180 |
| 4,806,807 A | 2/1989 | Levino | |
| 5,659,944 A * | 8/1997 | Thiard-Laforet | H02K 3/505 228/165 |
| 5,717,267 A * | 2/1998 | Paroz | H02K 3/22 310/260 |
| 5,809,632 A * | 9/1998 | Champagne | H02K 3/24 29/402.03 |
| 6,577,038 B2 * | 6/2003 | Butman | H02K 3/22 310/201 |
| 6,784,573 B1 * | 8/2004 | Iversen | B23K 33/00 310/201 |
| 7,045,704 B2 * | 5/2006 | Areskoug | H01F 27/16 174/15.1 |
| 7,334,316 B2 * | 2/2008 | Wang | H02K 3/22 219/129 |
| 7,837,087 B2 * | 11/2010 | Breznak | B23K 1/0008 219/615 |
| 9,705,370 B2 * | 7/2017 | Koyama | H02K 3/24 |
| 2006/0108107 A1 | 5/2006 | Naukkarinen | |

FOREIGN PATENT DOCUMENTS

| | | |
|---|---|---|
| JP | 05029783 A | 2/1993 |
| WO | 2004/017490 A1 | 2/2004 |

OTHER PUBLICATIONS

<http://www.luvata.com/Documents/Special Products/Hollow Conductors/Copper Hollow Conductors_ENG.pdf>.
<https://en.wikipedia.org/wiki/Ultimate_tensile_strength> (<https://de.wikipedia.org/w/index.php?title=Zugfestigkeit&oldid=129026058>).
<https://en.wikipedia.org/w/index.php?title=Copper_wire_and_cable&oldid=601887455>.
International Search Report issued in corresponding PCT Application No. PCT/EP2015/057400 dated Jul. 17, 2015.
Japanese Office Action issued in corresponding Japanese Application No. 2017-503069 dated Dec. 13, 2017.
European Examination Report issued in European Application No. 15717442.6 dated Oct. 8, 2018, with English translation, 10 pages.

* cited by examiner

ELECTRICAL HOLLOW CONDUCTOR FOR AN ELECTROMAGNETIC MACHINE

CROSS REFERENCE TO RELATED APPLICATIONS

This application is a U.S. National Stage Application of International Application No. PCT/EP2015/057400, filed Apr. 2, 2015, the entire contents of which are incorporated herein by reference.

SUMMARY

This invention relates to an electrical hollow conductor in the shape of a tubular body having a hollow interior for continuously winding an electromagnetic coil, wherein the body comprises an electrically conductive material, an outside diameter and an inside diameter, and is coated with at least one electrically insulating layer on an outer casing surface of the body, and wherein the interior is configured in such a way that it hydraulically or pneumatically connects a first open end of the body and a second open end of the body.

This invention further relates to a use of an electrical hollow conductor of the invention for winding an electromagnetic coil.

This invention still further relates to a connecting piece for connecting at least one electrical hollow conductor of the invention and a coolant line, comprising a leak-proof housing having a hollow interior, at least one hollow conductor opening in the housing for receiving an open end of the electrical hollow conductor and a coolant opening in the housing for receiving an open end of the coolant line, wherein the interior is configured in such a way that it hydraulically or pneumatically connects the hollow conductor opening and the coolant line opening.

Lastly, this invention relates to an electromagnetic machine comprising a magnet unit and a conductor unit that electromagnetically interacts with the magnet unit, wherein the conductor unit has at least one electrical conductor.

Electrical hollow conductors in terms of this invention are used for electrically conducting an electric current and simultaneously for hydraulically or pneumatically conducting a coolant. Alternative designations for electrical hollow conductor are hollow wire or electrically conductive hollow wire.

Generic electrical hollow conductors are known in the prior art and are used in large and complex systems such as superconducting magnets, particle accelerators, fusion reactors, and breakeven performance turbogenerators. The electrical hollow conductors installed therein are typically wound, shaped, or assembled from individual windings into large electromagnetic coils with large bend radii. Here, it is necessary for the individual turns of the electrical hollow conductor to be electrically insulated from each other in order to prevent the coil from short circuiting. A disadvantage of an electrically insulating layer is that it is also generally a very good heat insulator, which prevents the removal of heat generated from the flow of an electric current. The greater the current flow, the greater the amount of heat that is produced. However, since the conducting of large flows or, in relative terms, the achievement of high current densities is one of the key criteria for an efficient operation of the aforementioned systems, efficient heat removal is essential. In order to ensure efficient heat removal, a coolant is pumped through the electrical hollow conductor and the heat is thus removed internally. It would be desirable if this ideal way of removing heat were also available for small and mid-sized electromagnetic machines of everyday life. Small electromagnetic machines in terms of this invention are typically mass produced and have a maximum output of less than 5 MW. Examples of such include electric motors for household appliances, hand tools, construction equipment, tractors, machine tools, electric motors for land vehicles, water vehicles and aircraft, and generators for wind power plants. However, small and mid-sized electromagnetic machines have small dimensions. The electromagnetic coils in particular must be small, hence it is necessary to achieve small bend radii in the preferred automated winding of the coils. The electrical hollow conductors known from the large systems are not suitable for this. Indirect cooling techniques such as water jacket cooling or oil mist cooling are generally employed for small and mid-sized systems.

The object of this invention is therefore that of specifying an electric hollow conductor of the aforementioned type, which can be used in small and mid-sized electromagnetic machines.

For achieving this object, this invention proposes an electrical hollow conductor of the aforementioned type in which a ratio of the outside diameter to the inside diameter is in a range of 1.25:1 to 4:1. The outside diameter is preferably within a range of 1.0 mm to 3.2 mm. With the proposed outside diameter and outside diameter to inside diameter ratio, the electrical hollow conductor is an ideal compromise between small dimensioning, high conductivity, and sufficient workability without a disadvantageous narrowing of the interior at bends. The required small bend radii can be formed without giving rise to a detrimental change to the cross-sectional shape of the body when winding over edges with small radii, and in particular without the electrical hollow conductor rupturing, tearing off, or kinking. Owing to its outside diameter, the electrical hollow conductor is just as thin as the wires that are otherwise normally used to wind such coils. Wires in terms of this invention are solid wires without a hollow interior. In this respect, basically any electromagnetic machine with an output greater than ca. 1 kW that has standard wire coils can be equipped or retrofitted with hollow conductor coils without any compatibility problems. The proposed outside diameter to inside diameter ratio is ideal for achieving and maintaining a relatively large current flow in the electrical hollow conductor for a long time, in other words for a continuous operation of the electromagnetic machine. In optimizing the electrical hollow conductor of the invention, consideration was given to the following parameters: cross-sectional area of the body, in order to provide sufficient surface area for conducting the electric current; cross-sectional area of the hollow interior, in order to provide sufficient surface area for conducting the coolant; geometry of the cross-sectional areas, in order to provide sufficient contact length for transferring the heat from the body to the coolant; geometry of the cross-sectional areas, so as not to obstruct the flow of the coolant; geometry of the cross-sectional area of the body, in order to obtain a sufficiently flexible electrical hollow conductor; geometry of the cross-sectional area of the body, in order to obtain a hollow conductor with sufficient tensile strength; and geometry of the cross-sectional area of the body, in order to obtain a sufficiently kink-proof electrical hollow conductor in which the interior will not tend to narrow during bending. Other parameters were the material of the body and consequently its electrical conductivity, heat conductivity, elastic moduli, the nature and the thickness of the electrically insulating layer, the nature (viscosity, heat conductivity, heat capacity, and heat transfer coefficient) and flow rate of the coolant, the winding pattern of the coil, and the intensity and frequency of the electric current. In simulations and experiments it was shown that the inventively dimensioned electrical hollow conductor is ideally suited for winding coils for installation in small and mid-sized electromagnetic machines, wherein an output density of an electromagnetic machine equipped with an electrical hollow conductor is substantially increased compared to an electromagnetic machine equipped with a wire. The outside diameter of the body of the electrical hollow conductor is particularly preferably between 2.0 mm and 3.0 mm, for example 2.5 mm, and in any case the ratio of the outside diameter to the inside diameter is 1.5:1 or 2:1. The advantages described in the preceding are most pronounced with these values. If sufficient winding room is available, then preference is given to larger outside diameters, in particular if hand-wound small batches of small and mid-sized electromagnetic machines are being produced.

Furthermore, the tubular body of the electrical hollow conductor can be configured as a cylindrical tube, an oval tube, a square tube, a rectangular tube, or a combination of these. An example of a possible combination would be a tube that is square on the outside and round on the inside. To describe and claim the present invention, the generally intelligible terms outside diameter and inside diameter will be used for an outside dimension and an inside dimension of the tubular body, since the tubular body is preferably configured as a cylindrical tube. For angular tube cross sections, a diagonal outside dimension corresponds to the outside diameter and a diagonal inside dimension corresponds to the inside diameter. The tubular body is preferably configured as a cylindrical tubular body, in which the cylindrical tube is round on the outside and the inside. Because of the circular outer shape of the tubular body, the electrical hollow conductor of the invention is identical on the outside to a solid wire conductor, hence the electrical hollow conductor can be handled and used in essentially the same manner as a wire conductor. For example, the process of a manual or automated turning or winding of a coil is identical and the coil wound with an electrical hollow conductor is just as good in terms of winding quality as a coil wound with a wire conductor. With other outer shapes, in particular angular outer shapes, the process of winding, in particular automated winding, turns out to be considerably harder and thus routinely results in coils of inferior winding quality, or else is not feasible from a process engineering standpoint because of the outer shape. This is due to the fact that the geometry is altered when the (for example, square) electrical hollow conductor or wire conductor is subjected to torsion, resulting in an inadequate fit accuracy when two or more turns of the coil are wound together into a compact winding with a high turn density. To prevent the electrical hollow conductor from kinking in the event of very tight bend radii, it can be advantageous if the winding body (e.g., an anchor) on which the coil is wound has channel-like recesses for receiving a first layer of windings of the coil. The electrical hollow conductor is guided laterally by the channel-like recesses. This lateral guiding prevents the widening of the electrical hollow conductor that normally occurs at potential kinking sites. If the layers are wound in such a way that they sink into one another, the respective underlying layer forms a lateral guide for each additional layer. In addition, there is the possibility of shaping the stator plates and rotor plates such that preferred radii are provided for the electrical hollow conductors during the alignment of the stator plates and rotor plates, respectively.

In an advantageous embodiment of this invention, the material is copper, aluminum, or an alloy of one of the aforesaid materials. The material is preferably copper, because copper offers high electrical conductivity and high heat conductivity for conducting large electrical flows and for efficiently transferring the heat to the coolant, respectively. Furthermore, copper is sufficiently elastic and has sufficient tensile strength for producing electrical hollow conductors with the proposed dimensions and winding them into coils. In addition, copper electrical hollow conductors exhibit a sufficiently smooth microscopic surface structure after drawing, which prevents eddies from forming in the coolant and is conducive to a laminar flow of the coolant. The material is typically a copper alloy comprising ca. 99.5% copper and ca. 0.5% magnesium rather than pure copper. Such a copper alloy is also used in wires and is therefore commercially available in large quantities and at moderate prices. As an alternative, the material can be another conductive metal such as silver, gold, or platinum, or a conductive plastic or composite material.

The electrical hollow conductor of the invention preferably has a tensile strength ranging from 75 $N/mm^2$ to 225 $N/mm^2$. The tensile strength of the electrical hollow conductor is based on how the material was worked during manufacturing as well as on the geometry of the body and the material. Tensile strength is one of the decisive parameters for automated winding. If the tensile load capacity is too small, the electrical hollow conductor will tear during manual or automated winding. If the tensile load capacity is too great, the electrical hollow conductor is too rigid and will kink during winding. Particular preference is given to the tensile strength of the electrical hollow conductor being in the range of 100 $N/mm^2$ to 200 $N/mm^2$, for example equal to 150 $N/mm^2$. All specified tensile strengths apply in particular to 1% elongation of the electrical hollow conductor.

In another embodiment of this invention, the layer is an enamel layer or a bandage. Enamel layers can be applied evenly and thinly to electrical hollow conductors and are therefore particularly suitable for very thin electrical hollow conductors. In addition to a first layer, the electrical hollow conductor can be coated with other layers. Two or more layers result in better insulation and thus a greater dielectric strength of the electrical hollow conductor, for example up to 10 kV. Electrical hollow conductors are enamel coated by means of a wire enameling machine in a continuous enameling process such as the one generally known for the production of enameled copper wires. A bandaging of electric hollow conductors is an alternative kind of coating. The layer can be plastic-based. All other possible methods for applying an insulating layer to a wire conductor can be used in analogous fashion for applying the insulating layer to the electric hollow conductor.

The elasticity and plasticity of the electrical hollow conductor of the invention are adjusted according to the parameters discussed in the preceding in such a way that the electric hollow conductor can be wound over tight radii with a run as parallel as possible to a surface of a winding body, without the electric hollow conductor being damaged. In order to prevent damage to the insulating layer during winding, the insulating layer must also have sufficient elasticity and plasticity.

The use of large electrical hollow conductors for winding large electromagnetic coils for the large systems described in the preceding is known to the prior art. However, the large electrical hollow conductors can either not be bent at all or not tightly enough for winding small coils for small electromagnetic machines. Also known to the prior art is the use of small hollow conductors in cooling circuits and thermostats, where they function as purely hydraulic conductors and as sensors, respectively, and do not need to be wound into coils.

In order to provide the necessary flexibility of electrical hollow conductors for winding electromagnetic coils, this invention proposes a use of an electrical hollow conductor of the invention for the continuous winding of at least one complete turn of an electromagnetic coil. The advantages discussed in the preceding render the electric hollow conductor of the invention ideal for winding small coils for small electromagnetic machines. Winding a small coil with one or more complete turns is only possible because of the bending properties of the electric hollow conductor of the invention. However, continuous turns of a coil are essential so as not to obstruct the flow of coolant through the electrical hollow conductor. The number of continuous coils lies in a range of one to 10,000 or more and is equal to, for example, two, five, ten, 20, 50, 100, 150, 200, 250, 500, 750, 1000, 2000 or 5000.

In a further embodiment of the present invention, the electromagnetic coil is an electromagnetic coil of an electromagnetic machine with a maximum output of less than 5 MW. Electromagnetic machines with maximum outputs of less than 5 MW are deemed small or mid-sized electromagnetic machines in terms of this invention. Particularly advantageous is the use of the electrical hollow conductor of the invention for the continuous winding of at least one complete turn of an electromagnetic coil of an electromagnetic machine with a maximum output of less than 1 MW, for example 500 kW, 200 kW, 100 kW, 50 kW, 20 kW, 10 kW or 5 kW. Even in very small electromagnetic coils, the use of the electrical hollow conductor of the invention has positive effects, especially if high current densities are generated. Examples of small electromagnetic machines in which the coils are equipped or capable of being equipped with the electrical hollow conductor of the invention include generators for small power plants, generators for wind power plants, electric motors for motor vehicles, in particular for cars, electric motors for locomotives, electric motors for aircraft, electric motors for machine tools, electric motors for conveyors, electric motors for electric household appliances, electric motors for computers, in particular for driving a fan, transformers, frequency converters, induction machines, transducers, linear motors, relays, contactors, MRI machines with a magnetic flow density of up to 10 T, smaller particle accelerators, induction ovens, plasma applications, and all other possible applications.

Connecting pieces for establishing purely hydraulic or pneumatic connections of pipelines are generally known. A coolant, for example, circulates in such pipelines. Owing to their relatively large size, however, such connecting pieces are not suitable for receiving an electrical hollow conductor according to the invention in a functional manner, because the latter has relatively small dimensions. Furthermore, the flow resistance increases substantially for the coolant in pipes with small inside diameters or long line lengths. This is especially true for the slender electrical hollow conductors of this invention. In large electromagnetic systems with large-dimensioned electrical hollow conductors on the other hand, a relatively low pressure prevails in the cooling circuit, hence polytetrafluorethylene (PTFE, Teflon®) coolant lines can be used. It should also be noted that the electrical hollow conductors of the invention are not only used for hydraulically or pneumatically conducting the coolant, but also for electrically conducting electric currents.

Depending on the configuration of a coil or coil array of an electromagnetic machine, it is necessary to divide the coil wound with the electrical hollow conductor according to the invention into two or more coil sections, wherein the individual coil sections must be connected to each other and to a coolant line. Where applicable, the connection of the coil sections or of two electrical hollow conductors to each other in general must be electrically conductive. Furthermore, the connection of the coil sections or of two electrical hollow conductors and the coolant line in general must be hydraulically or pneumatically conductive. However, as a rule the connection of the coil sections or of two electrical hollow conductors and the coolant line may not be electrically conductive, as otherwise different phases would be short circuited, for example. The coolant circulating in the electrical hollow conductors and in the coolant line consists of an electrically insulating fluid, wherein the fluid can be a liquid or a gas. It is also conceivable for the fluid in a coolant circuit to undergo phase transitions.

An object of this invention is therefore that of specifying a connecting piece of the aforementioned type that will functionally connect an electrical hollow conductor according to the invention to a coolant line.

For achieving this object, this invention proposes a connecting piece of the aforementioned type in which the hollow conductor opening has a diameter that is adapted to an outside diameter of a body of the electrical hollow conductor to be received. The diameter of the hollow conductor opening is in particular slightly smaller than, equal to, or slightly larger than the outside diameter of the body of the electrical hollow conductor that is to be received in the hollow conductor opening. Adjusting the dimensioning of the hollow conductor opening to the electrical hollow conductor to be received for a precise fit or nearly precise fit makes it possible to establish a leak-proof and permanent connection between the housing of the connecting piece and the electrical hollow conductor in a very advantageous manner. The diameter of the hollow conductor opening preferably lies in a range of 1.0 mm to 3.2 mm. Analogously, it also holds true that adjusting the dimensioning of the coolant line opening to the coolant line to be received for a precise fit or nearly precise fit makes it possible to establish a leak-proof and permanent connection between the housing of the connecting piece and the coolant line in a very advantageous manner. As a whole the electrical hollow conductor is connected to the coolant line in a functional, in particular leak-proof manner. The connecting piece according to the invention is preferably configured as an initial piece or end piece that connects the electrical hollow conductor to the coolant line before or after, respectively, the electrical hollow conductor forms an electromagnetic coil.

The electrical hollow conductor can be connected to the housing by means of the following connection techniques: soft soldering, hard soldering, ultrasound welding, press fitting, bolting into a female thread, bolting with a press ring, bolting with nuts, riveting, gluing, molding, fusion with glass, sintering or vulcanizing. A bolt connection can be dismantled without destruction and allows the electrical hollow conductor to be replaced. Furthermore, a bolt connection can be combined with an adhesive bond or an enamel bond for a durable, vibration-resistant, and leak-proof connection.

In a preferred embodiment of the present invention, the housing provides a depth stop for limiting an insertion depth of the electrical hollow conductor into the housing. The depth stop is formed in particular by a narrowing of the diameter of the hollow conductor opening.

In an advantageous embodiment of the present invention, provision is made such that the connecting piece has a housing insert, wherein the housing insert is configured to pass through the housing and so that a hollow interior of the housing insert provides the hollow conductor opening. In a very advantageous manner the housing insert provides a variable interface between the housing and the electrical hollow conductor, which permits a leak-proof attachment of the electrical hollow conductor to the housing. The housing can be made of an electrically conductive material or of an electrically insulating material. The housing insert can be made of an electrically conductive material or of an electrically insulating material, wherein, in the latter case, the housing insert serves as an electrically insulating separator element between the electrical hollow conductor and the coolant line.

The housing insert can be connected to the housing by means of the following connection techniques: soft soldering, hard soldering, ultrasound welding, press fitting, bolting into a female thread, bolting with a press ring, bolting with nuts, riveting, gluing, molding, fusion with glass, sintering or vulcanizing. A bolt connection can be dismantled without destruction and allows the electrical hollow conductor to be replaced. Furthermore, a bolt connection can be combined with an adhesive bond or an enamel bond for a durable, vibration-resistant, and leak-proof connection. Optionally, washers can be used. The same connection techniques can be used to connect the electrical hollow conductor to the housing insert.

Furthermore, the housing insert can be composed of the following materials: brass, iron, copper, silver, gold, aluminum, or an alloy of one of the aforementioned materials.

In an advantageous embodiment of the present invention, provision is made such that the housing insert provides a depth stop for limiting the depth to which the electrical hollow conductor is inserted into the housing. The depth stop is preferably formed by a narrowing of the diameter of the hollow interior of the housing insert.

According to the invention, further provision is made such that the interior can be configured as rounded. With rounding, corners and edges at which notch stress would otherwise arise are avoided and the pressure resistance of the connecting piece is thus improved.

In a particularly advantageous embodiment of this invention, the connecting piece is configured for connecting at least two electrical hollow conductors of the invention and a coolant line, wherein the connecting piece comprises at least two hollow conductor openings in the housing for receiving open ends of the electrical hollow conductors, wherein the interior is configured for hydraulically or pneumatically connecting the hollow conductor openings and the coolant line opening, wherein the connecting piece has an electrically conductive contact element and an electrically insulating separator element, wherein the contact element is configured for electrically connecting at least two hollow conductor openings, and wherein the separator element is arranged in an electrically insulating manner between the contact element and the hollow conductor openings on the one hand and the coolant line opening on the other hand. Under the condition that the coolant circulating in the electrical hollow conductors and in the coolant line is an electrically insulating fluid, in a very advantageous manner the contact element and the separator element effect an electrical coupling of the electrical hollow conductors, a hydraulic or pneumatic coupling of the electrical hollow conductors and the coolant line, and an electric decoupling of the electrical hollow conductors on the one hand and of the coolant line on the other hand. An uninterrupted current flow from electrical hollow conductor to electrical hollow conductor is thus possible without involving the coolant line and negatively impacting the electric circuit. This is essential to the invention because in order to withstand the necessary nominal pressures as great as 200 bar, the coolant line is normally made of metal and thus also electrically conductive like the electrical hollow conductors. Without the separator element of the invention, the coolant line and perhaps a coolant pump would be included in the electric circuit of the electrical hollow conductors and would require electrical insulation from the surroundings. The connecting piece of the invention is able to withstand temperatures ranging from −35° C. to 200° C., is puncture proof, sufficiently robust for long-term operation, and resistant to bursting pressures up to 1000 bar. The nominal pressure for long-term operation is between 80 bar and 200 bar, preferably ca. 120 bar.

In a very advantageous embodiment of the present invention, the contact element is the housing and the separator element is configured as an electrically insulating sleeve passing through the housing, wherein a hollow interior of the electrically insulating sleeve provides the coolant line opening. An electrically conductive housing made, for example, out of copper, brass, or steel fulfills several functions in a very advantageous manner. Firstly, the housing serves to provide a hollow interior for conducting the coolant between the electrical hollow conductors and the coolant line. Secondly, the housing serves as an electrical connecting member between the electrical hollow conductors. Thirdly, the housing can function as an electrical and hydraulic or electrical and pneumatic collecting member for a plurality of electrical hollow conductors and a coolant line. Fourthly, the housing can function as an electrical interface between a hollow conductor-based coil and a standard electrical wire conductor for the infeed or removal of an electric current. To this end, the housing can comprise a contact loop, a contact pin, or a contact terminal. The electrically insulating sleeve is preferably a ceramic sleeve. A ceramic component, in particular the ceramic sleeve, is best suited as a separator element because ceramic materials are sufficiently puncture proof, able to withstand a wide range of temperatures, and sufficiently stable under pressure. For example, the ceramic sleeve can be metallized inside and outside, in particular by means of a steel coating. The metallized sleeve is thus solderable and weldable. The ceramic sleeve typically has a wall thickness of ca. 0.5 mm. As an alternative to ceramics, the separator element can comprise an electrically insulating component made of plastic, glass, rubber, or silicone. Rather than a ceramic sleeve, in particular use can be made of a plastic sleeve, a glass sleeve, a rubber sleeve, or a silicone sleeve. The connecting piece according to the invention is preferably configured as a T-piece, Y-piece, or collecting member. The collecting member bundles or separates, for example, two, three, four, eight, twelve, 16, 20, 24, 36, 48 or more electrical hollow conductors, which are used as separate lines or as lines of a stranded conductor.

The coolant line is preferably connected to the connecting piece via a ceramic sleeve. Provision is made of a depth stop in order to ensure an adequate insertion depth of the electrical hollow conductor into the connecting piece. An excessively deep insertion would cause the electrical hollow conductor to short circuit with the housing or with the coolant line. Owing to the high pressure prevailing at least on a supply side of the coolant circuit, an insufficiently deep insertion would lead to an unwanted forcing of the electrical hollow conductor out of the connecting piece. Provision is made of the following connection techniques for connecting the coolant line and the hollow conductor(s) via a connecting piece: soft soldering, hard soldering, ultrasound welding, press fitting, bolting with a press ring, bolting with nuts, riveting, gluing, molding, fusion with glass, sintering or vulcanizing. The same techniques can be used to close hollow conductor openings not fitted with electrical hollow conductors. As an alternative, instead of an electrical hollow conductor a piece of solid wire can be inserted in the hollow conductor opening as a plug or a solid wire can be inserted in the hollow conductor opening as a coil terminal, also by using one of the aforementioned techniques.

In connecting pieces having a two- or multi-part housing, the housing parts can be configured in such a way that they center themselves as they are being joined together. The housing parts comprise, for example, truncated cone-shaped or truncated pyramid-shaped areas for this purpose.

As an alternative to an electrically conductive housing as a contact element in combination with an electrically insulating sleeve as a separator element, an electrically insulating housing can be the separator element and a conductor piece arranged in or on the housing for electrically connecting the hollow conductor openings can be the contact element. Notwithstanding the above, the separator element can also be configured as an electrically insulating hose, which leads to a pump for pumping the coolant. A housing insert arranged between the housing and the electrical hollow conductor can act as a contact element if the housing insert is made of an electrically conductive material. A housing insert arranged between the housing and the electrical hollow conductor can act as a separator element if the housing insert is made of an electrically insulating material.

In another embodiment of this invention, a first group of electrically connected hollow conductor openings is electrically insulated from a second group of electrically connected hollow conductor openings by means of the separator element or another separator element. The individual groups form separate electric circuits, which are used to conduct different phases of a three-phase current, for example. In addition to two and three groups, four, five, or more groups are also comprised by the present invention.

In a very advantageous embodiment of this invention, the hollow conductor openings have different diameters. A single connecting piece is thus able to supply electrical hollow conductors with different diameters. For example, a primary winding and a secondary winding of a transformer can have different hollow conductor diameters.

According to the invention, provision is made of the following materials for manufacturing connecting pieces: metals such as copper or steel, thermoplastic synthetics, duroplastic synthetics, ceramics, or glasses. Metals are electrically conductive, easily workable, and pressure resistant. Thermoplastic synthetics are slightly elastic and therefore relatively break proof. Duroplastic synthetics are highly dimensionally accurate and heat resistant over a wide range. Ceramics are very durable and the surfaces thereof can be metallized, preferably with copper, silver, or gold, which is advantageous when it comes to soldering. Glasses are highly voltage resistant.

In an alternative embodiment of this invention, the connecting piece does not have a housing. Instead, a free end of an electrical hollow conductor or free ends of two or more electrical hollow conductors are arranged directly in a free end of a coolant line and fastened onto or in the coolant line, for example by soft soldering, hard soldering, ultrasound welding, press fitting, bolting into a female thread, bolting with a press ring, bolting with nuts, riveting, gluing, molding, fusion with glass, sintering, or vulcanizing.

Electromagnetic machines are generally known and as a rule comprise a magnet unit and a conductor unit interacting electromagnetically with the magnet unit, wherein the conductor unit has at least one electrical conductor. When it comes to obtaining optimum performance of an electromagnetic machine, the electric current density in the conductor is one of the most important parameters. The increased amount of heat generated in the conductor at high current densities is a limiting factor for performance. Efficient heat removal is critical for mitigating this limiting factor. In standard electromagnetic machines, the conductor is configured as an electrically and therefore normally also heat insulated wire, hence only an unsatisfactory heat removal is possible and the current density achievable in practice lies far below a theoretically possible current density for lack of sufficient capacity for cooling the conductor.

An object of this invention is therefore that of specifying an electromagnetic machine of the aforementioned type that provides optimum performance.

To achieve this object, the present invention proposes an electromagnetic machine of the aforementioned type in which the electrical conductor is an electrical hollow conductor according to the invention. The advantages described for the electrical hollow conductor are directly transferable to the electromagnetic machine. In particular, a use of the hollow interior of the electrical hollow conductor as a coolant channel enables an efficient removal of heat in a very advantageous manner, because the heat is removed from where it is generated, namely in the body of the electrical hollow conductor. Larger current densities are thus achievable in practice. Data from experiments show that an increase of the current density from 6 A/mm$^2$ with a wire conductor to 24 A/mm$^2$ to 40 A/mm$^2$ with the electrical hollow conductor of the invention is possible. Along with this, the electromagnetic machine of the invention achieves considerably more performance. Compared to a solid wire conductor of the same size, the electrical hollow conductor requires less material for forming the conductor, hence the electrical hollow conductor contributes to a reduced overall weight of the electromagnetic machine according to the invention. The electrical hollow conductor can be made sufficiently small so that effects due to capillary forces are more than negligible in the hollow interior. In this case the electrical hollow conductor could also be designated as a capillary conductor. Because the skin effect becomes clearly noticeable at high frequencies, for example greater than 10 kHz, in particular greater than 30 kHz, particularly preferably greater than 100 kHz, a conductive interior of a solid wire conductor is no longer absolutely necessary anyway for conducting high amperages.

The electrical hollow conductor of the invention is equally well-suited for both synchronous machines and asynchronous machines. Self-excited synchronous machines do not require any magnets and a load-dependent adjustment of an exciter current is possible. Permanently excited synchronous machines therefore have a very good power to weight ratio. High current densities are achievable by means of the internal and thus direct cooling of the conductor unit, which leads to even more power output. Furthermore, the electrical hollow conductor according to the invention can be used for winding tooth-wound coils for synchronous machines, for example. From a process engineering standpoint, tooth-wound coils are easily produced and do not have any end winding lengths, hence there is more active ferromagnetic material available. Asynchronous machines do not require magnets either. In addition, an asynchronous machine rotor is very easily constructed as a squirrel cage rotor.

Furthermore, the electromagnetic machine can have at least one connecting piece of the invention. The connecting piece is preferably configured as a T-piece, Y-piece, or collecting member. The connecting piece permits a hydraulic or pneumatic coupling of the electrical hollow conductors and the coolant line, an electric coupling of the electrical hollow conductors, and an electric decoupling of the coolant line. In addition, the connecting piece configured as a collecting member unites or separates a plurality of electrical hollow conductors.

In a particularly advantageous embodiment of the present invention, provision is made such that the electromagnetic machine has a cooling unit, wherein the cooling unit comprises a pump and the electric hollow conductor and perhaps connecting pieces, wherein the pump is configured for pumping a coolant through the electric hollow conductor. The pump can be directly driven by the electromagnetic machine; for example, the pump can be operatively connected to a shaft of the electromagnetic machine, or it can be indirectly driven by means of a separate pump drive. The connecting pieces, if any, are preferably configured as connecting pieces according to the invention. The coolant consists of an electrically insulating fluid that preferably has a high heat capacity and a high thermal conduction coefficient. The use of the electrical hollow conductor as an element of the cooling unit of the electromagnetic machine enables a highly efficient removal of performance-limiting heat, since this heat, also known as thermal energy, is removed from where it is generated, namely in the body of the electrical hollow conductor. Owing to the heat removal that is superior to that of the prior art, the electromagnetic machine according to the invention is considerably more efficient and thus has an optimum power output. With the electromagnetic machine according to the invention, current densities of ca. 40 $A/mm^2$ are possible, whereas a water-jacket cooling or an oil mist cooling only permits ca. 12 $A/mm^2$, and an air cooling only permits ca. 3 $A/mm^2$.

In an advantageous embodiment of the present invention, provision is made such that the magnet unit and the conductor unit are configured symmetrically to an axis of rotation, arranged coaxially to the axis of rotation, and capable of rotating relative to each other about the axis of rotation, wherein the magnet unit comprises at least two magnets, wherein each of the magnets has a north pole and a south pole, and wherein the electrical hollow conductor has alternatingly induction-active segments and induction-passive segments, wherein in at least one alignment of the conductor unit relative to the magnet unit, the induction-active segments are arranged exclusively opposite neutral zones existing between north poles and south poles. In a very advantageous manner, this arrangement of the electrical hollow conductor to the magnet enables a particularly effective temporal progression of the induction, which contributes substantially to an optimum performance of the electromagnetic machine. In terms of this invention, magnets can be permanent magnets as well as electromagnets. As a rule, the latter have a coil, with which an iron core is magnetized or also excited. Alignments comprising electromagnets are therefore also known as core-excited field alignments. Neutral zones can form between the north pole and the south pole of a single magnet or between poles of two or more magnets in abutment with each other or spaced apart from each other. The arrangement of the poles generally causes a geometric expansion of the neutral zones, which can be sharply delimited or diffuse and small or large, for example several to dozens of centimeters in size.

In a first specific development of the present invention, the magnet unit is configured as an outer hollow cylinder and an inner hollow cylinder arranged in the outer hollow cylinder, wherein a gap for receiving the conductor unit is arranged between the outer hollow cylinder and the inner hollow cylinder and wherein the neutral zones are arranged parallel to the axis of rotation. Such a magnet unit provides a magnetic field in the gap, which is ideally suited for effectively suffusing a conductor unit arranged in the gap and thus ensuring a high induction. The outer hollow cylinder and the inner hollow cylinder are interconnected in a torsionally rigid manner with respect to the axis of rotation. For example, the outer hollow cylinder comprises twelve magnets, which are arranged along a peripheral direction of the outer hollow cylinder in such a way that they are oriented the same way in terms of polarity and evenly distributed, giving rise to a north-south-north-south, etc., pole sequence. Neutral zones are thus provided in the transition from the north pole to the south pole of a magnet as well as between two neighboring magnets. Adapted to the outer cylinder, the inner cylinder likewise comprises twelve magnets, which are arranged along a peripheral direction of the inner cylinder that is inverse to the peripheral direction of the outer cylinder in such a way that they are oriented the same way in terms of polarity and evenly distributed, giving rise to a north-south-north-south, etc., pole sequence. The orientation of the outer hollow cylinder relative to the inner hollow cylinder is such that each north pole of the outer hollow cylinder on the respective side of the gap is opposite a south pole of the inner hollow cylinder on the other respective side of the gap. Neutral zones are thus provided at the transition from the north pole to the south pole of a magnet, between two neighboring magnets within a hollow cylinder, and between two poles separated by the gap. The number of magnets per hollow cylinder can also be two, four, six, eight, ten, 16, 20, 24, 28, 32, 36, 40, 80, 120, 160, 200 or 500. At high rotation speeds and average amperage, a large number of magnets leads to very high torques in the electromagnetic machine according to the invention.

In a second specific development of the present invention, the magnet unit is configured as a first disc and a second disc arranged adjacent to the first disc, wherein a gap for receiving the conductor unit is arranged between the first disc and the second disc and wherein the neutral zones are arranged radially to the axis of rotation. Such a magnet unit provides a magnetic field in the gap, which is ideally suited for effectively suffusing a conductor unit arranged in the gap and thus ensuring a high induction. The first disc and the second disc are interconnected in a torsionally rigid manner with respect to the axis of rotation. For example, the first disc comprises twelve magnets, which are arranged along a peripheral direction of the first disc in such a way that they are oriented the same way in terms of polarity and evenly distributed, giving rise to a north-south-north-south, etc. pole sequence. Neutral zones are thus provided in the transition from the north pole to the south pole of a magnet as well as between two neighboring magnets. Adapted to the first disc, the second disc likewise comprises twelve magnets, which are arranged along a peripheral direction of the second disc that is inverse to the peripheral direction of the first disc in such a way that they are oriented the same way in terms of polarity and evenly distributed, giving rise to a north-south-north-south, etc. pole sequence. The orientation of the first disc relative to the second disc is such that each north pole of the first disc on the respective side of the gap is opposite a south pole of the second disc on the other respective side of the gap. Neutral zones are thus provided at the transition from the north pole to the south pole of a magnet, between two neighboring magnets within a disc, and between two poles separated by the gap. The number of magnets per disc can also be two, four, six, eight, ten, 16, 20, 24, 28, 32, 36, 40, 80, 120, 160, 200 or 500. At high rotation speeds and average amperage, a large number of magnets leads to very high torques in the electromagnetic machine according to the invention.

The electromagnetic machine preferably has a connecting element for connecting hollow cylinders or discs, respectively, of magnet units. The connecting element acts as a three-dimensional yoke for amplifying magnetic fields in areas that are configured to receive conductor units.

For the first specific development of this invention, the conductor unit is configured as a hollow cylinder, wherein the induction-active segments are arranged parallel to the axis of rotation. The hollow cylinder preferably has a diameter that is identical to a diameter of the cylindrical gap. The hollow cylinder also preferably has a wall thickness that is slightly less than a width of the cylindrical gap. The conductor unit thus fits exactly into the magnet unit, except for two narrow air gaps between the conductor unit and the magnet unit. Such a combination of a magnet unit and a conductor unit is ideally suited for effectively suffusing the conductor unit arranged in the gap and thus ensuring a high induction. The electrical hollow conductor is arranged in a sinuous manner and connected to a support, in particular embedded in a groove of the support and covered with epoxy resin. The conductor loops are formed such that the induction-active segments are longer than the induction-passive segments. The electrical hollow conductor can be arranged in several turns, for example in two to 100, in particular in 24 with four turns per layer and six layers.

For the second specific development of this invention, the conductor unit is configured as a disc in which the induction-active segments are radially arranged. The disc preferably has a thickness that is slightly less than a width of the gap. The conductor unit thus fits exactly between the conductor unit and the magnet unit into the magnet unit, except for two narrow air spaces between the conductor unit and the magnet unit. Such a combination of the magnet unit and the conductor unit is ideally suited for suffusing the conductor unit arranged in the gap and thus ensuring a high induction. The electrical hollow conductor is arranged in a sinuous manner and connected to a support, in particular embedded in a groove of the support and covered with epoxy resin. The conductor loops are formed such that the induction-active segments are longer than the induction-passive segments. The electrical hollow conductor can be arranged in several windings, for example in two to 100, in particular in 24 with four windings per layer and six layers.

In a further embodiment of this invention, the electrical hollow conductor is configured as a stranded conductor. This stranded conductor comprises a plurality of individual electrical hollow conductors that jointly form the strand. Compared to a solid wire of the same dimensions, the strand conductor has a substantially larger surface area, which at high frequencies, for example higher than 10 kHz, in particular higher than 30 kHz, particularly preferably higher than 100 kHz, enables the conduction of large flows, for example 16 A/mm$^2$, 20 A/mm$^2$ or 24 A/mm$^2$ of conductor cross-sectional area, owing to the skin effect. To this end, the stranded conductor has two to as many as 400 or more, in particular 32 individual hollow conductors that are electrically insulated from one another. Individual hollow conductors that are electrically insulated from one another divide the large cross-sectional area of the electrical hollow conductor into several, preferably many small cross-sectional areas of the individual hollow conductors, which inhibits the formation of efficacy-diminishing eddy currents.

According to the invention, in a very advantageous manner provision is made such that a length ratio of the induction-active segments to the induction-passive segments is greater than or equal to 3:1, in particular equal to 4:1, 5:1, 6:1, 8:1, 10:1, 15:1, 20:1 or 30:1, since only the induction-active segments are used for the conversion of mechanical energy into electrical energy or vice versa and are thus conducive to the efficiency of the electromagnetic machine. The induction-passive segments on the other hand lower the efficiency because they constitute electrical resistances that inhibit electrical conduction and lead to energy losses in the form of waste heat. In general, if the ratio of the lengths of induction-active segments to induction-passive segments is greater than 1:1, the efficiency of an electromagnetic machine of any design, not necessarily one according to the invention, will be increased compared an electromagnetic machine of the same design, but with equally long induction-active and induction-passive segments.

The electromagnetic machine can be configured without an iron core, in particular as in the first and second specific developments of this invention. Owing to the arrangement of the conductor unit in the magnet unit, an iron core is not required for ensuring sufficient magnetic suffusion of the conductor unit. By not having an iron or laminated core, the electromagnetic machine has a lower overall weight, is less sluggish, and is not subject to hysteresis. An electromagnetic machine configured in this manner is consequently ideally suited for aerospace applications and for high accelerations and long delays, and is highly efficient.

The electromagnetic machine of the invention can be configured such that the magnet unit is a rotor, in particular a dual rotor, and the conductor unit is a stator of the electromagnetic machine. As an alternative, according to the invention provision is made such that the magnet unit can be a stator, in particular a dual stator, and the conductor unit can be a rotor of the electromagnetic machine. On the one hand, the first alternative can be advantageous because it is easier from a technological standpoint to tap a voltage from the electrical hollow conductor or to apply a voltage to the electrical hollow conductor. On the other hand, the second alternative can be advantageous because the conductor unit, owing to its light weight in comparison to the magnet unit, is less sluggish and thus the rotor consumes less power during an acceleration.

The electromagnetic machine of the invention can be used as, for example, a motor, a generator, a motor-generator combination, or a flywheel energy storage system and can therefore be used in vehicles with two or more wheels with an electric drive or a recuperation brake system, steam turbines, gas turbines, wind power plants, machine tools, pumps, model airplanes, drones, and other electrical devices. The electromagnetic machine according to the present invention is in particular ideally suited for applications with high rotation speeds, for example from 10 kHz to 100 kHz or more. From a technological standpoint, the upper frequency limit is determined by the available electric or electronic switch elements. Depending on the application, it may be possible to dispense with efficiency-reducing transmissions.

Another field of application for the electrical hollow conductor of the invention is that of evaporation pipes as part of a cooling unit of an electromagnetic machine. In addition, mention is made that superconductive material can be fastened in or onto the tubular body of the electrical hollow conductor in order to improve the electrical conductivity even further. To this end, for example, a casing pipe suited to the bending and rigidity properties of the superconductive material is provided under the electrically insulating layer. In a preferred embodiment, the body of the electrical hollow conductor is encased with an optional separator layer, which is encased with the superconductive material, which is encased with the insulating layer. The superconductive material can be, for example, a ceramic superconductor, in particular a high temperature superconductor.

In an exemplary manner, this invention will be described with reference to the drawings, wherein additional advantageous details can be deduced from the figures of the drawings. The parts of this invention that are the same across the figures have the same reference signs.

DETAILED DESCRIPTION

Figure 1:
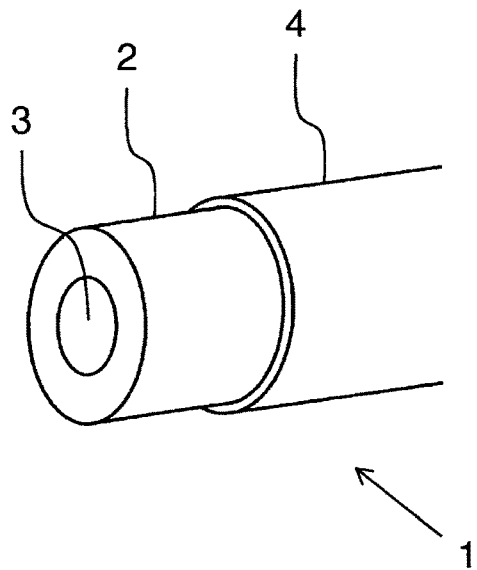
FIG. 1 a schematic, perspective view of an electrical hollow conductor according to the present invention.

FIG. 1 shows a schematic, perspective view of an electrical hollow conductor 1 according to the present invention. The electrical hollow conductor 1 has the shape of a cylindrical tubular body 2, which has a hollow interior 3. The body 2 is composed of an electrically conductive material, specifically a copper alloy. The body 2 furthermore has an outside diameter and an inside diameter. On an outer casing surface of the body 2, said body 2 is coated with an electrically insulating layer 4 of insulating enamel. The interior 3 hydraulically and pneumatically connects a first open end of the body 2 and a second open end of the body 2. The outside diameter is 3 mm and the inside diameter is 2 mm. Thus the ratio of the outside diameter to the inside diameter is 1.5:1. Owing to its dimensioning, the electrical hollow conductor 1 is very advantageously suited for the continuous winding of an electromagnetic coil of a small or mid-sized electromagnetic machine.

Figure 2:
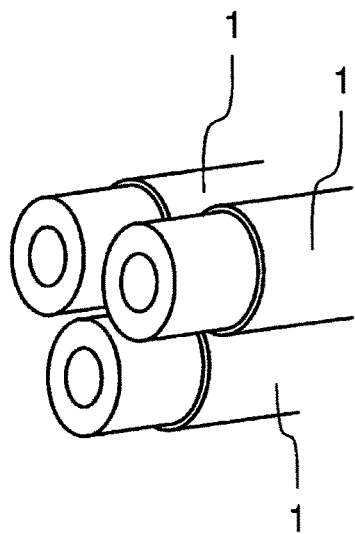
FIG. 2 a schematic, perspective view of a strand comprising three electrical hollow conductors according to the present invention.

FIG. 2 shows a schematic, perspective view of a strand comprising three electrical hollow conductors 1 according to the present invention. A strand as a rule comprises from three to several hundred electrical hollow conductors 1. The electrical hollow conductors 1 illustrated in FIG. 2 are electrically insulated from each other by means of a layer 4 of insulating enamel. As an alternative, the layer 4 could be omitted so that the electrical hollow conductors 1 would contact the outer casing surfaces of the body 2 in an electrically conductive manner.

Figure 3:
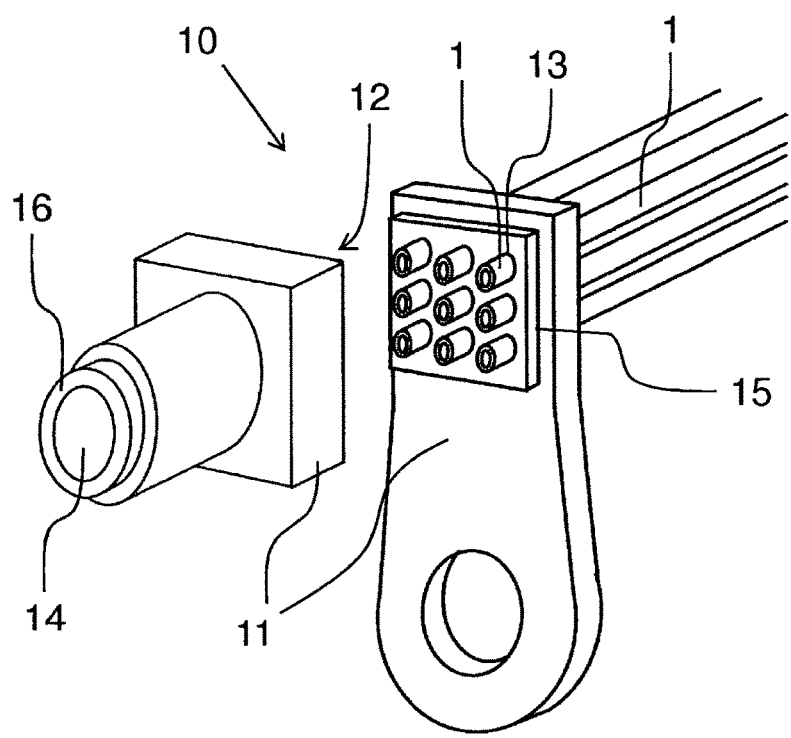
FIG. 3 a schematic, perspective view of a connecting piece according to a first embodiment of the present invention.

FIG. 3 shows a schematic, perspective view of a connecting piece 10 according to the present invention. The connecting piece 10 is used to connect a plurality of electrical hollow conductors 1 of the invention and a coolant line. The connecting piece 10 illustrated in FIG. 3 is configured as a collecting member for electrically and hydraulically joining or separating the plurality of electrical hollow conductors 1. The connecting piece 10 comprises a leak-proof housing 11, which has a hollow interior 12. The housing 11 is configured as a two-piece housing, but can also be configured as a single-piece or as a multiple-piece housing. For better comprehension of the present invention, the housing 11 is illustrated as opened. The connecting piece 10 further comprises a plurality of hollow conductor openings 13 (but for the sake of clarity only nine are shown) in the housing 11 for receiving open ends of the electrical hollow conductors 1, and a coolant line opening 14 in the housing 11 for receiving an open end of the coolant line. The interior 12 hydraulically and pneumatically connects the hollow conductor openings 13 and the coolant line opening 14. The connecting piece 10 has an electrically conductive contact element 15 and an electrically insulating separator element 16, wherein the contact element 15 is configured for electrically connecting the hollow conductor openings 13 and wherein the separator element 16 is arranged in an electrically insulating manner between the contact element 15 and the hollow conductor openings 13 on the one hand and the coolant line opening 14 on the other hand. In the connecting piece 10 illustrated in FIG. 3, the contact element 15 is the housing 11. In particular, a part of the two-piece housing 11 is configured as a contact plate, which has a plurality of bores and which transitions in shape to a contact loop. The contact plate is configured as thicker in a zone of the bores because the electrical hollow conductors 1 passing through the bores are soldered to the contact plate there. The separator element 16 is configured as an electrically insulating sleeve passing through the housing 11, wherein a hollow interior of the electrically insulating sleeve provides the coolant line opening 14. The electrically insulating sleeve is in particular a ceramic sleeve. The contact loop of the contact element 15 is a single electrical feeding point for supplying the plurality of electrical hollow conductors 1 with current. The coolant line opening 14 is a single hydraulic feeding point for supplying the plurality of electrical hollow conductors 1 with the coolant. The same is true for a tapping of the current at the contact loop and a channeling out of the coolant, respectively. An inside diameter of the contact loop is ca. 10 mm. The coolant consists of an electrically insulating fluid such as transformer oil, Therminol®, Galden® or carbon dioxide.

Figure 4:
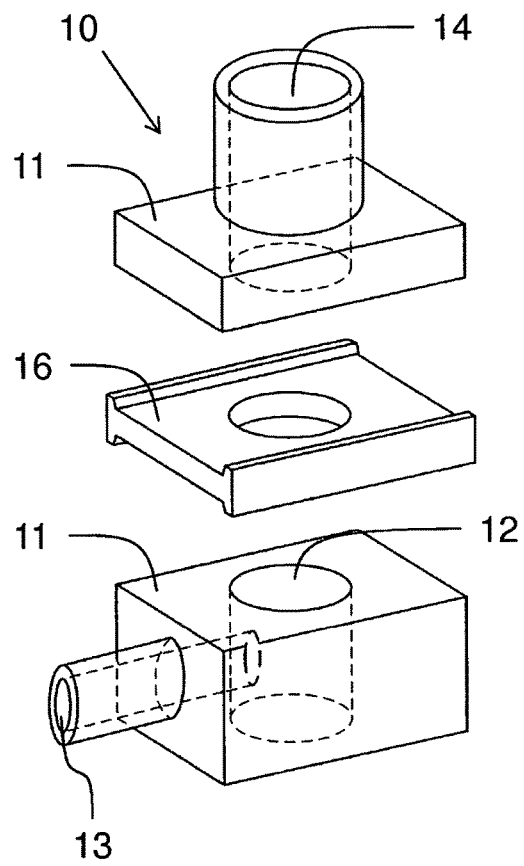
FIG. 4 a schematic, perspective view of a connecting piece according to a second embodiment of the present invention.

FIG. 4 shows a schematic, perspective view of a connecting piece 10 according to a second embodiment of the present invention. The connecting piece 10 is configured as an initial piece or an end piece that connects the electrical hollow conductor 1 to the coolant line before or after, respectively, the electrical hollow conductor 1 forms an electromagnetic coil. The connecting piece 10 is modular in design and can be expanded by any number of modules. The housing 11 is configured as a two-piece housing and comprises a coolant line opening 14 and a hollow conductor opening 13. The two parts of the housing 11 are optionally separated by means of an electrically insulating plate, as can be discerned in the exploded view of FIG. 4. The electrically insulating plate provides a separator element 16 for electrically insulating the two parts of the housing 11. Bulging edge zones of the electrically insulating plate serve as spacers for spacing a clamping device for connecting modules of the connecting piece 10, in order to keep the two parts of the housing 11 from short circuiting via the clamping device, and as guide for aligning the modules evenly. The electrically insulating plate can have bulging edge zones, or not. The interior 12 is formed by bores, which pass through all components except for a closing plate not illustrated in FIG. 4 and which are arranged overlapping one another in an assembled state of the connecting piece 10. Independently of one another, the two parts of the housing 11 can be composed of an electrically insulating material or of an electrically conductive material. The two parts of the housing 11 are preferably made of a metal in order to specify a sufficiently pressure-proof housing 11. The coolant line opening 14 and the hollow conductor opening 13 are provided by tubular sections that are either constituent elements of the parts of the housing 11 or components separate from the parts of the housing 11.

Figure 5:
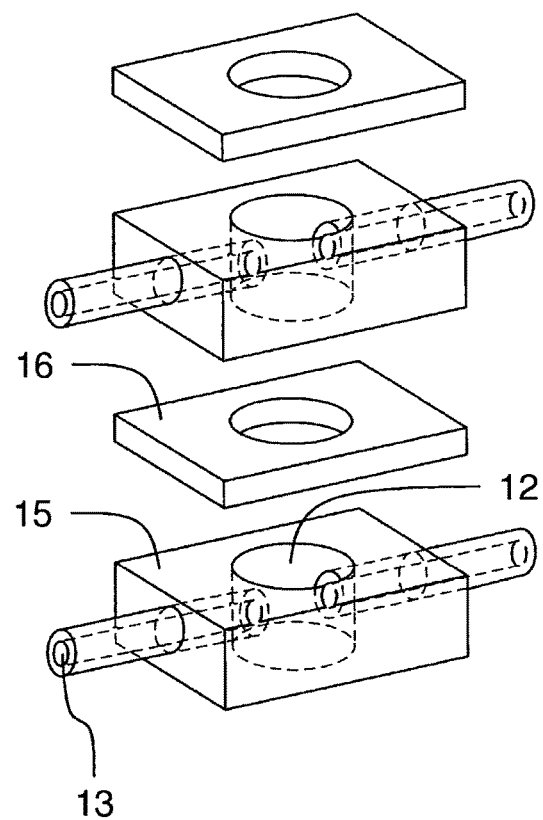
FIG. 5 a schematic, perspective view of an optional part of the connecting piece according to the second embodiment of the present invention.

FIG. 5 shows a schematic, perspective view of an optional part of the connecting piece 10 according to the second embodiment of the present invention. The connecting piece 10 is modular in design and can be expanded by any number of contact elements 15 for receiving electrical hollow conductors 1 and electrically insulating plates as separator elements 16. The electrically insulating plates can have bulging edge zones. Although individual contact elements 15 could potentially short circuit with each other, for example by omitting an electrically insulating plate, at least one electrically insulating plate is arranged between each of the contact elements 15 and the coolant line opening 14 in order to keep the coolant line opening 14 electrically neutral. The interior 12 is formed by stacking the individual modules.

In general, the modular connecting pieces 10 preferably have a clamping device for holding the individual modules of the connecting piece 10 together. The clamping device can comprise a centrally arranged screw or threaded rod or one or more brackets arranged on the outside.

Figure 6:
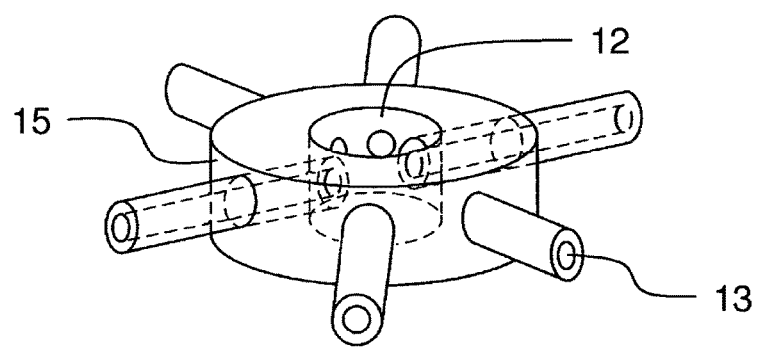
FIG. 6 a schematic, perspective view of another optional part of the connecting piece according to the second embodiment of the present invention.

FIG. 6 shows a schematic, perspective view of another optional part of the connecting piece 10 according to the second embodiment of the present invention. This contact element 15 of the connecting piece 10 is star-shaped and comprises six hexagonally arranged hollow conductor openings 13 that symmetrically surround the interior 12. As an alternative to six hollow conductor openings 13, the connecting piece 10 can have any number of hollow conductor openings 13, for example two, three, four, five, seven, eight, ten or more. The arrangement of the hollow conductor openings 13 can also be irregular.

Figure 7:
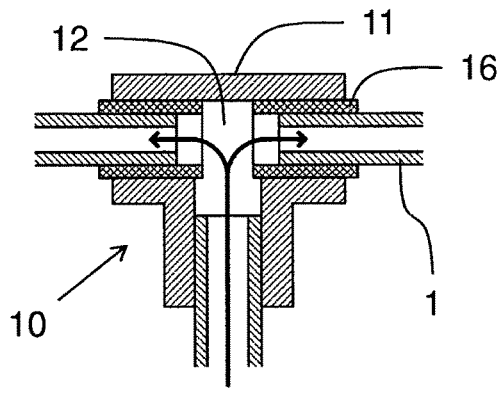
FIG. 7 a schematic sectional view of a connecting piece according to a third embodiment of the present invention.

FIG. 7 shows a schematic sectional view of a connecting piece 10 according to a third embodiment of the present invention. The connecting piece 10 is a T-piece and equipped with two separator elements 16, which electrically separate the metallic housing 11 from the two hollow conductor openings 13. Hence both electrical hollow conductors 1 and the coolant line are electrically insulated from each other. The separator elements 16 are electrically insulating sleeves, in particular ceramic sleeves, which are internally and externally metallized. A contact element 15 for connecting the electrical hollow conductors 1 could be a strip conductor embedded in the housing 11, which would extend from one hollow conductor opening 13 to the other hollow conductor opening 13. A contact element 15 for connecting the electrical hollow conductors 1 could also be an electrically conductive connection arranged on the outside. None of these optional embodiments are illustrated in FIG. 7. The housing 11 is made of a metal, but could also consist of a plastic. The arrow depicted in the interior 12 indicates an example of a flow direction of the coolant. The coolant flows out of the coolant line via the coolant line opening 14 into the interior 12 and from there through the hollow conductor openings 13 into the electrical hollow conductors 1. The connecting piece is thus a T-piece in an infeed of the coolant circuit upstream of a coil. The flow direction could also be the other way around. Then the T-piece would be in a discharge of the coolant circuit downstream of a coil.

Figure 8:
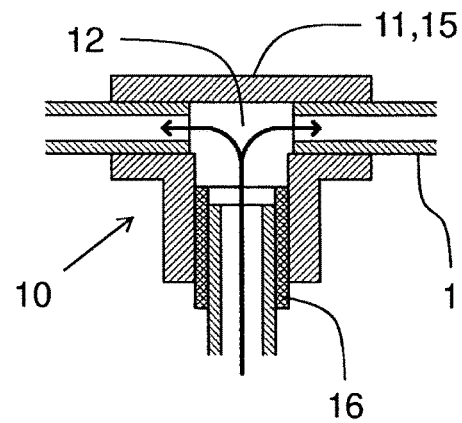
FIG. 8 a schematic sectional view of a connecting piece according to a fourth embodiment of the present invention.

FIG. 8 shows a schematic sectional view of a connecting piece 10 according to a fourth embodiment of the present invention. The connecting piece 10 is a T-piece, wherein the contact element 15 is formed by the metal housing 11 and the separator element 16 is configured as an electrically insulating sleeve, in particular a ceramic sleeve, passing through the housing 11. The coolant line opening 14 is provided by a hollow interior of the ceramic sleeve. The two hollow conductor openings 13 are connected to each other in an electrically conductive manner by the metal housing 11. The arrow depicted in the interior 12 indicates an example of a flow direction of the coolant. The coolant flows out of the coolant line via the coolant line opening 14 into the interior 12 and from there through the hollow conductor openings 13 into the electrical hollow conductors 1. The connecting piece is thus a T-piece in an infeed of the coolant circuit upstream of a coil. The flow direction could also be the other way around. Then the T-piece would be in a discharge of the coolant circuit downstream of a coil.

Figure 9:
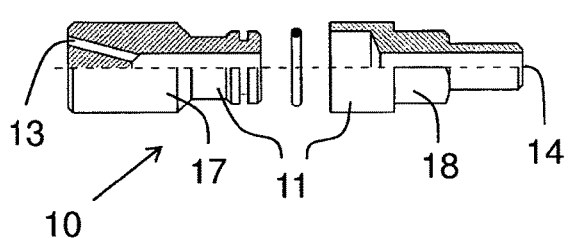
FIG. 9 a schematic sectional view of a connecting piece according to a fifth embodiment of the present invention.

FIG. 9 shows a schematic sectional view of a connecting piece 10 according to a fifth embodiment of the present invention. The connecting piece 10 is a collecting member for joining or separating three electrical hollow conductors 1 (also see FIG. 10). The housing 11 is a two-piece housing and comprises a male part 17, which is made of an electrically conductive material and which forms the contact element 15 between the hollow conductor openings 13, and a female part 18, which is made of an electrically insulating material and which forms the separator element 16 in which the coolant line opening 14 is formed. The male part 17 and the female part 18 are configured so that they can be connected, wherein a sealing ring ensures that the interior 12 formed by the male part 17 and the female part 18 is leak proof. The connecting piece 10 optionally has a screw closure or bayonet closure. In an alternative embodiment, the contact element 15 is female and the separator element 16 is male, thereby electrically insulating all hollow conductor openings 13 and the coolant line opening 14 from each other. If the contact element 15 is female and metal, its edge can be tightly coiled or rather crimped onto the male separator element 16. In yet another embodiment, the male part 17 and the female part 18 are made of an electrically insulating material, for example a ceramic material. Here too all hollow conductor openings 13 and the coolant line opening 14 are electrically insulated from each other.

Figure 10:
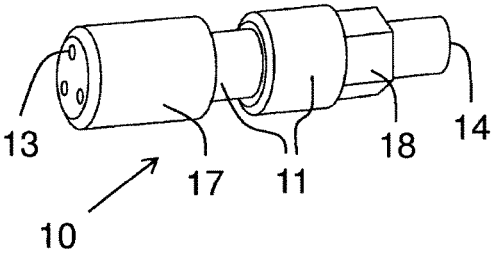
FIG. 10 a schematic, perspective view of a connecting piece according to the fifth embodiment of the present invention.

FIG. 10 shows a schematic, perspective view of the connecting piece 10 according to the fifth embodiment of the present invention. The male part 17 and the female part 18 of the connecting piece 10 are assembled in order to form a leak proof housing 11. The three hollow conductor openings 13 in the male part 17 can be easily discerned; the coolant line opening 14 in the female part 18 is indicated.

Figure 11:
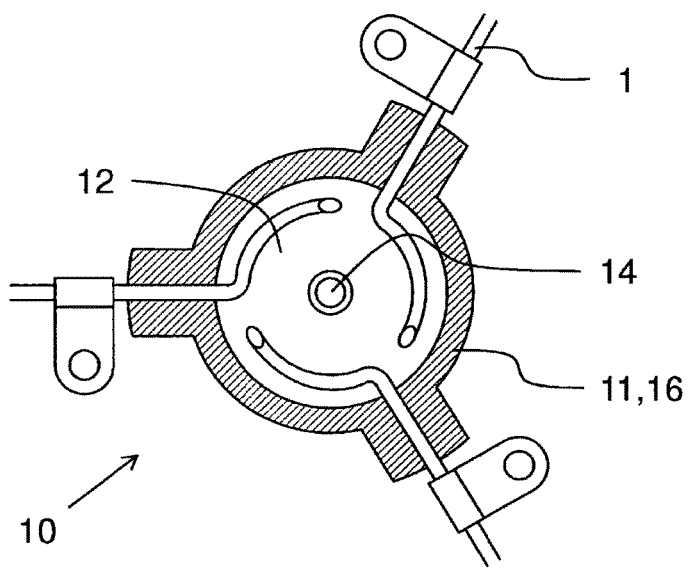
FIG. 11 a schematic sectional view of a connecting piece according to a sixth embodiment of the present invention.

FIG. 11 shows a schematic sectional view of a connecting piece 10 according to a sixth embodiment of the present invention. The connecting piece 10 is a Y-piece. The housing 11 is round and is made of an electrically insulating material. In a lengthwise extension, the housing 11 can in particular be cylindrical, spherical, or toroidal in shape. The Y-piece comprises three hollow conductor openings 13 and a centrally arranged coolant line opening 14. The housing 11 forms the separator element 16. The contact element 15 comprises three contact strips for contacting hollow conductors 1 and connecting lines (not illustrated in FIG. 11) for connecting the contact strips. The contact strips are optionally not connected in an electrically conductive manner. In the vicinity of the hollow conductor openings 13, the housing 11 is thickened in order to provide sufficient contact surface for fastening the electrical hollow conductors 1. Additionally, the electrical hollow conductors 1 extend far into the interior 12 and extend in a curve along the housing 11. The Y-piece is preferably disposed in a discharge of the coolant circuit downstream of the coil, wherein the coolant flows out from the electrical hollow conductors 1 into the interior 12. The curved arrangement of the electrical hollow conductors 1 gives rise to a vortical current in the interior 12, thus enabling an especially efficient discharge of the coolant into the coolant line. The electrical hollow conductors 1 extending far into the interior 12 can be at least partially covered with synthetic material, wherein the free ends of the electrical hollow conductors 1 are preferably curved upwards in order to be hydraulically or pneumatically connected to the interior 12.

In addition to the embodiment of a connecting piece 10 illustrated in FIG. 11, all other connecting pieces 10 can comprise an interior 12, which can be rounded or round and thus free of corners and edges. A rounded shape is more resistant to pressure than angular shapes, because a notch stress arising from the high pressure in the interior 12 is reduced in the former.

Figure 12:
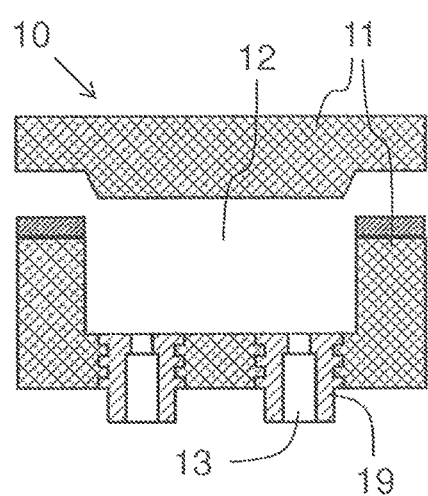
FIG. 12 a schematic sectional view of a connecting piece according to a seventh embodiment of the present invention.
Figure 16:
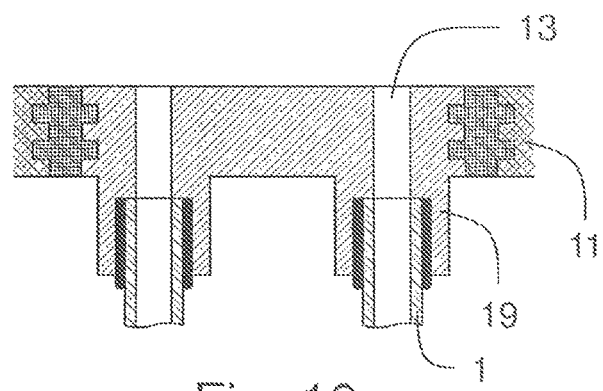
FIG. 16 a schematic sectional view of a housing insert of a connecting piece according to the present invention.

FIG. 12 shows a schematic sectional view of a connecting piece 10 according to a seventh embodiment of the present invention. The connecting piece 10 is configured in two parts, wherein a cover of the connecting piece 10 has a beveled edge on its inner side that is used to center the cover as the housing 11 is being joined together. The coolant line opening 14 is not illustrated. Each of the hollow conductor openings 13 is provided by a hollow interior of a housing insert 19. The housing insert 19 serves as a depth stop for the (not illustrated) electrical hollow conductor 1 and can be the separator element 16, provided that it is composed of an electrically insulating material. As a rule, the housing insert 19 is designed as electrically conductive and the housing 11 is designed as electrically insulating so that the housing 11 forms the separator element 16. The two hollow conductor openings 13 are thus electrically insulated from each other. An electrically conductive connection between the two hollow conductor openings 13 is possible by means of, for example, a dual housing insert 19 as illustrated in FIG. 16.

Figure 13:
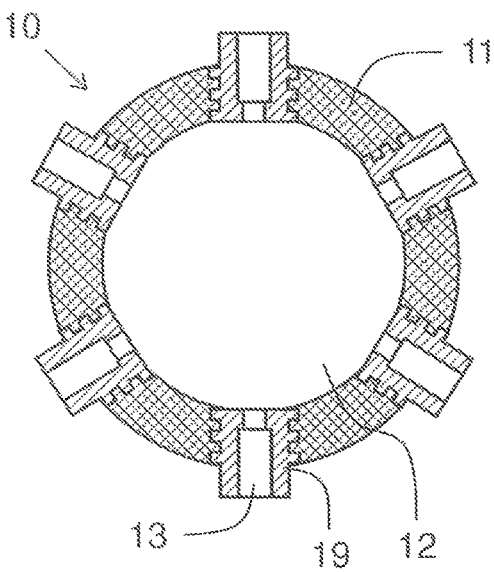
FIG. 13 a schematic sectional view of a connecting piece according to an eighth embodiment of the present invention.

FIG. 13 shows a schematic sectional view of a connecting piece 10 according to an eighth embodiment of the present invention. The connecting piece 10 has a circular cross section, wherein six hollow conductor openings 13 are arranged equidistantly along a circumference of the cross section. Each of the hollow conductor openings 13 is provided by a hollow interior of a housing insert 19, wherein the housing insert 19 has a depth stop and can be made of an electrically insulating material. As a rule, the housing insert 19 is designed as electrically conductive and the housing 11 is designed as electrically insulating so that the housing 11 forms the separator element 16. The six hollow conductor openings 13 are thus electrically insulated from each other. An electrically conductive connection between two hollow conductor openings 13 is possible by means of, for example, a dual housing insert 19 as illustrated in FIG. 16.

Figure 14:
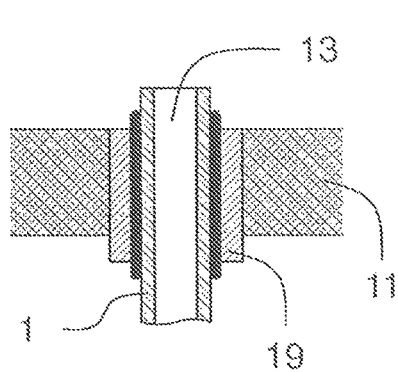
FIG. 14 a schematic sectional view of a housing insert of a connecting piece according to the present invention.

FIG. 14 shows a schematic sectional view of a housing insert 19 of a connecting piece 10 according to the present invention. The housing insert 19 is arranged between the electrically insulating housing 11 and the electrical hollow conductor 1 in the hollow conductor opening 13 in the form of a sleeve. The sleeve is press fitted into the housing 11 or connected to the housing 11 in some other way and does not have a depth stop for the electrical hollow conductor 1, hence the latter can be positioned deep inside the housing 11. The electrical hollow conductor 1 is soldered to the sleeve (see the dark areas). The solder joint is an electrically conductive connection.

Figure 15:
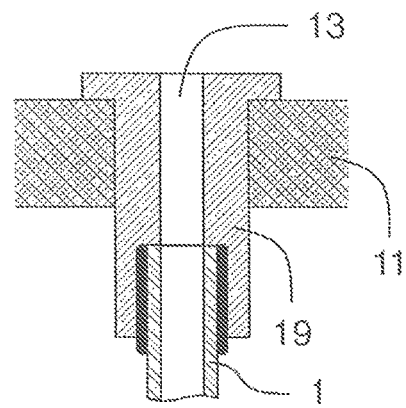
FIG. 15 a schematic sectional view of a housing insert of a connecting piece according to the present invention.

FIG. 15 shows a schematic sectional view of a housing insert 19 of a connecting piece 10 according to the present invention. The hollow conductor opening 13 of the connecting piece 10 is formed by a hollow interior of the housing insert 19, which passes through the electrically insulating housing 11. The electrical hollow conductor 1 is soldered to the housing insert 19, as indicated by the dark solder joint. The solder joint is an electrically conductive connection. The housing insert 19 projects noticeably above the housing 11 so that the solder joint is sufficiently distanced from the housing 11 in order to avoid poor quality solder joints due to undesired heat dissipation in the housing 11. The housing insert 19 additionally has a depth stop that enables the electrical hollow conductor 1 to be ideally positioned for good quality soldering.

FIG. 16 shows a schematic sectional view of a housing insert 13 of a connecting piece 10 according to the present invention. The housing insert 19 provides two hollow conductor openings 13 and is made of an electrically conductive material such that the housing insert 19 acts as a contact element 15 between the two electrical hollow conductors 1. This type of housing insert 19 is especially suited for applications with large electrical flows. The housing insert 19 is connected by vulcanizing to the electrically insulating housing 11 that forms the separator element 16. The electrical hollow conductors 1 extend to a diameter narrowing in the housing insert 19 and are welded, but could also be soldered to the housing insert 19 (see the dark areas). The diameter narrowing serves as a depth stop.

Figure 17:
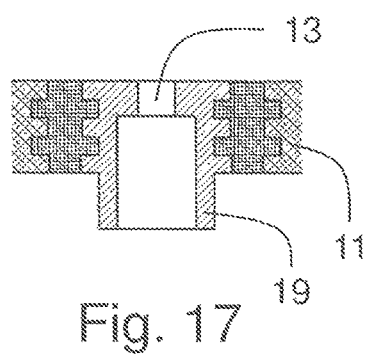
FIG. 17 a schematic sectional view of a housing insert of a connecting piece according to the present invention.

FIG. 17 shows a schematic sectional view of a housing insert 19 of a connecting piece 10 according to the present invention. The housing insert 19, which provides a depth stop, is vulcanized into the electrically insulating housing 11 that forms the separator element 16.

Regardless of the special embodiment, the housing insert 19 can be connected to the housing 11 by means of the following connecting techniques: soft soldering, hard soldering, ultrasound welding, press fitting, bolting into a female thread, bolting with a press ring, bolting with nuts, riveting, gluing, molding, fusion with glass, sintering or vulcanizing. A bolt connection can be dismantled without destruction and allows the electrical hollow conductors 1 to be replaced. Furthermore, a bolt connection can be combined with an adhesive bond or an enamel bond for a durable, vibration-resistant, and leak-proof connection. Optionally, washers can be used.

Also regardless of the special embodiment, the housing insert 19 can be composed of the following materials: brass, iron, copper, silver, gold, aluminum, or an alloy of one of the aforementioned materials.

Figure 18:
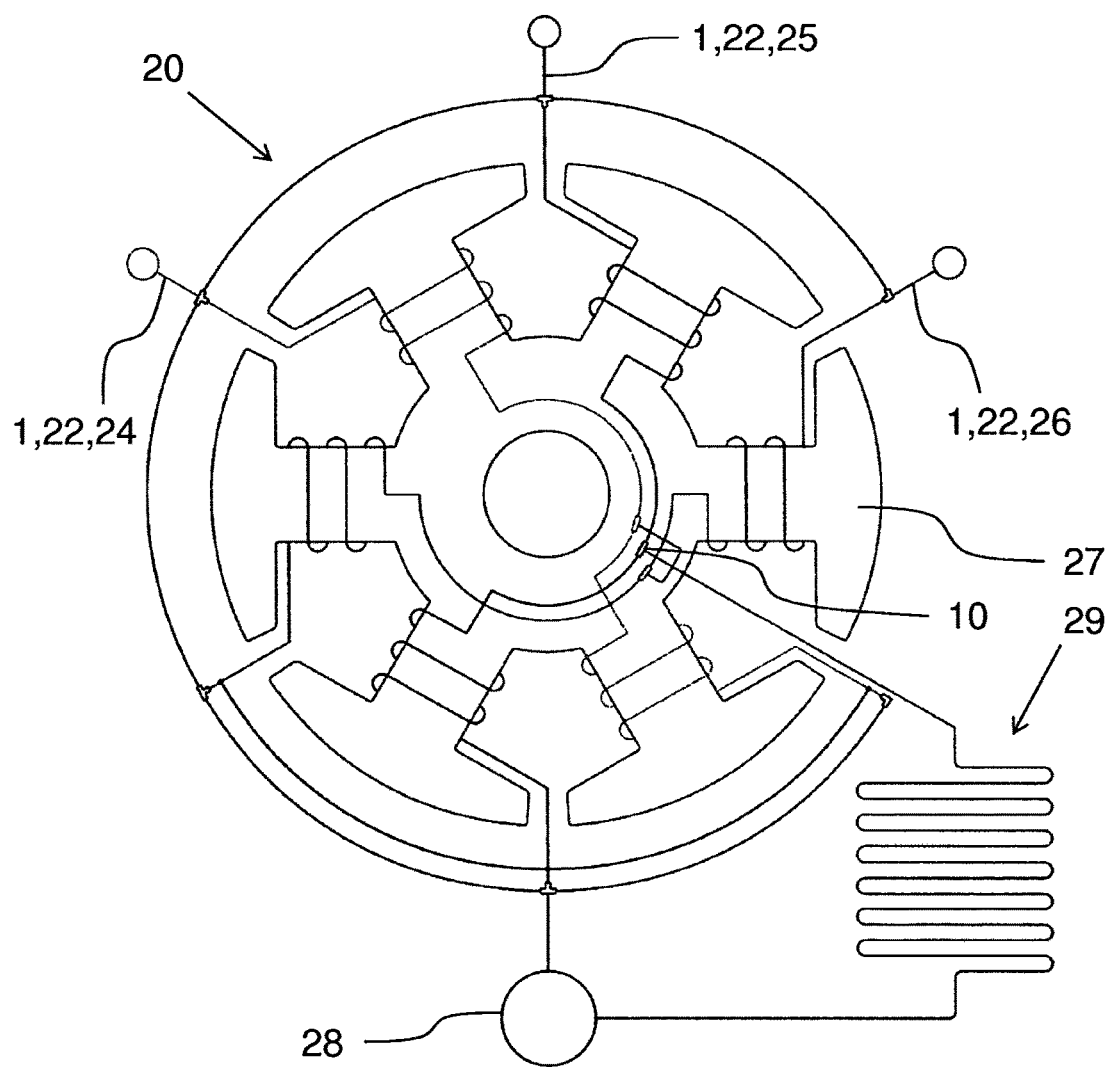
FIG. 18 a schematic sectional view of an electromagnetic machine according to a first embodiment of the present invention.

FIG. 18 shows a schematic view of an electromagnetic machine 20 according to a first embodiment of the present invention. The electromagnetic machine 20 comprises a magnet unit 21 and a conductor unit 22 interacting electromagnetically with the magnet unit 21, wherein the conductor unit 22 has three electrical conductors, specifically a first phase 24, a second phase 25, and a third phase 26.

The three phases 24, 25 and 26 are connected in a star or delta connection. For the sake of clarity, the magnet unit 21 is not illustrated in FIG. 18. Each of the phases 24, 25 and 26 is an electrical hollow conductor of the invention 1. This electromagnetic machine 20 is a three-phase current synchronous machine with three phases, wherein the phases 24, 25 and 26 form the conductor unit 22. The phases 24, 25 and 26 are wound on six anchor heads 27 distributed on a rotor of the electromagnetic machine 20. The electromagnetic machine 20 further comprises a cooling unit, wherein the cooling unit comprises a pump 28 and the electrical hollow conductors 1. The pump 28 pumps a coolant through the electrical hollow conductors 1. Additionally, provision is made of a heat exchanger 29 in order to cool the coolant heated after a pass through before it is fed back into the electrical hollow conductors 1 and thus discharge the heat into the surroundings or into an additional cooling device. The pump 28 and the heat exchanger 29 are connected by means of connecting pieces 10 of the invention to the electrical hollow conductors 1. In addition to synchronous machines, the invention also includes asynchronous machines, wherein each of the machine types can be excited by one or more permanent magnets or electromagnets.

Figure 19:
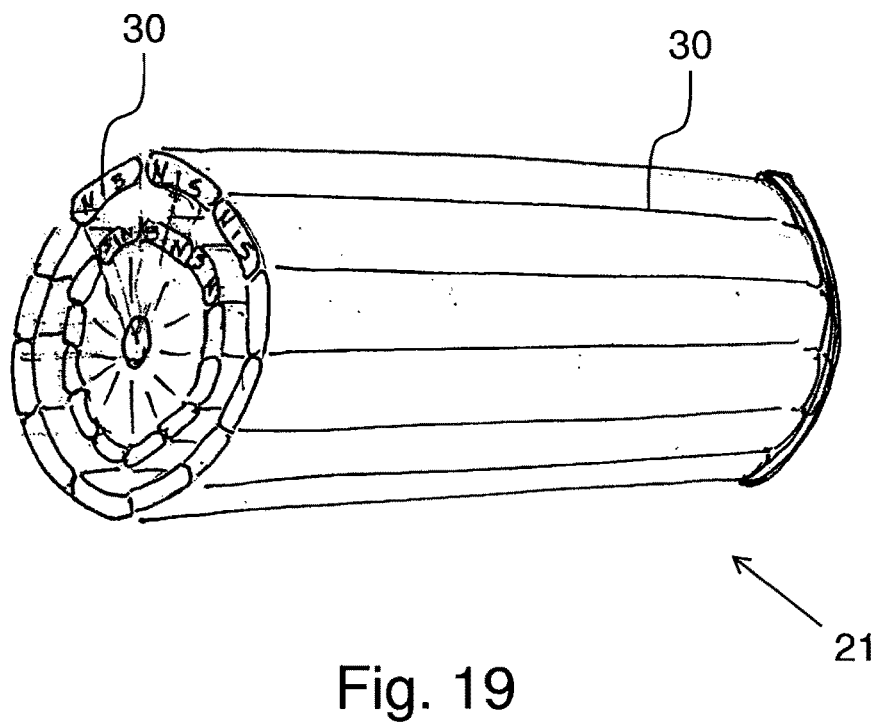
FIG. 19 a schematic, perspective view of a magnet unit of an electromagnetic machine according to a second embodiment of the present invention.

FIG. 19 shows a schematic, perspective view of a magnet unit 21 of an electromagnetic machine 20 according to a second embodiment of the present invention. The magnet unit 21 is configured as an outer hollow cylinder and an inner hollow cylinder arranged in the outer hollow cylinder. A gap for receiving the conductor unit 22 is arranged between the outer hollow cylinder and the inner hollow cylinder. The neutral zones 30 are arranged parallel to an axis of rotation. The magnet unit 22 according to FIG. 19 is configured as a dual rotor and has twelve magnets per hollow cylinder.

Figure 20:
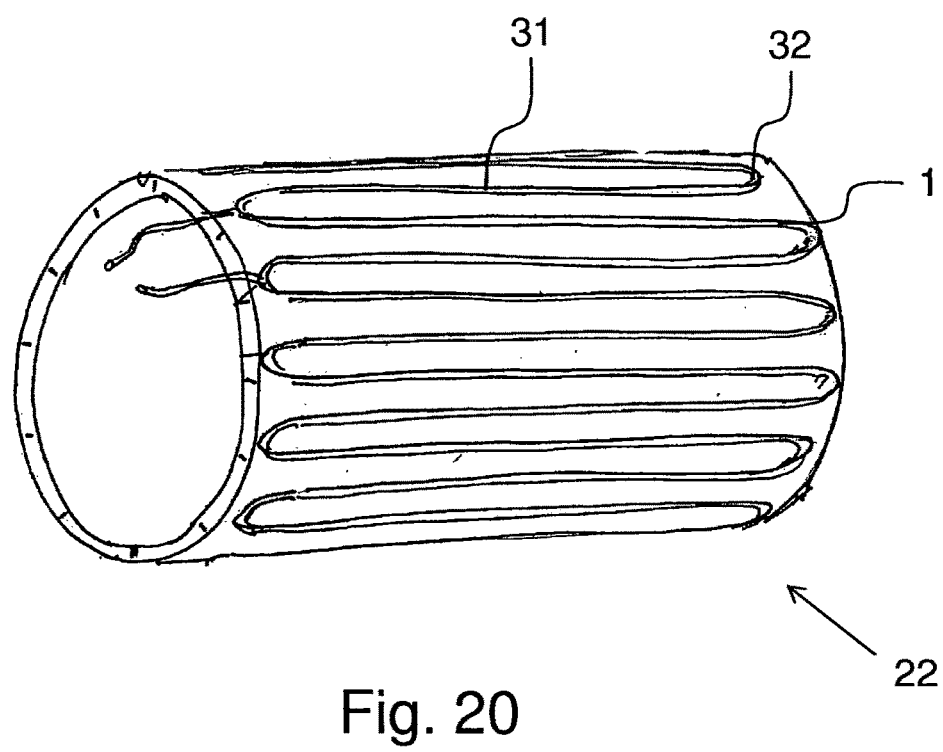
FIG. 20 a schematic, perspective view of a conductor unit of the electromagnetic machine according to the second embodiment of the present invention.

FIG. 20 shows a schematic, perspective view of a conductor unit 22 of the electromagnetic machine 20 according to the second embodiment of the present invention. The conductor unit 22 is configured as a hollow cylinder. The hollow cylinder serves as a support for the electrical hollow conductor 1. Induction-active segments 31 are arranged parallel to the axis of rotation; induction-passive segments 32 are arranged tangentially thereto. The length ratio of the induction-active segments 31 to the induction-passive segments 32 is 8:1.

Figure 21:
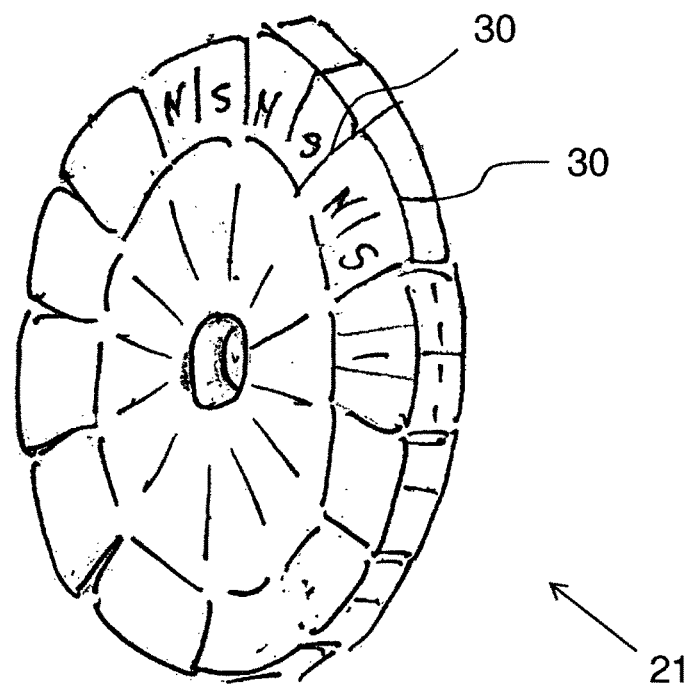
FIG. 21 a schematic, perspective view of a part of a magnet unit of an electromagnetic machine according to a third embodiment of the present invention.

FIG. 21 shows a schematic, perspective view of a part of a magnet unit 21 of an electromagnetic machine 20 according to a third embodiment of the present invention. The third embodiment is an arrangement transverse to the axis of rotation. The magnet unit 21 is configured as a first disc and a second disc arranged adjacent to the first disc, wherein the second disc is not illustrated in FIG. 21. The discs are identical in design, but with upper sides arranged opposite one another other on the axis of rotation such that a south pole S of the second disc faces a north pole N of the first disc and vice versa. A gap for receiving the conductor unit 22 is arranged between the first disc and the second disc. The neutral zones 30 are arranged radially to the axis of rotation. The magnet unit 21 according to FIG. 21 is configured as a dual rotor and has twelve magnets per disc.

Figure 22:
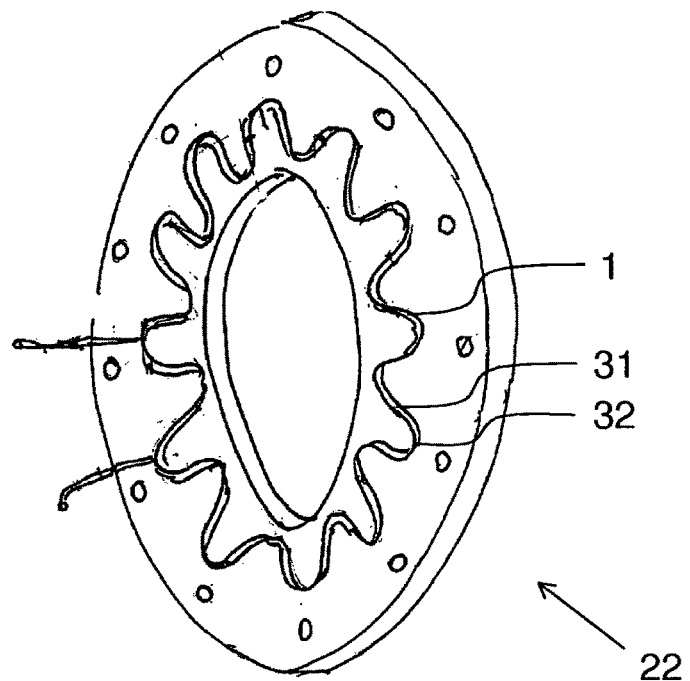
FIG. 22 a schematic, perspective view of a conductor unit of the electromagnetic machine according to the third embodiment of the present invention.

FIG. 22 shows a schematic, perspective view of a conductor unit 22 of the electromagnetic machine 20 according to the third embodiment of the present invention. The conductor unit 22 is configured as a disc. The disc serves as a support for the electrical hollow conductor 1. The induction-active segments 31 are arranged radially to the axis of rotation; the induction-passive segments 32 tangentially thereto. The length ratio of the induction-active segments 31 to the induction-passive segments 32 is 3:1.

Figure 23:
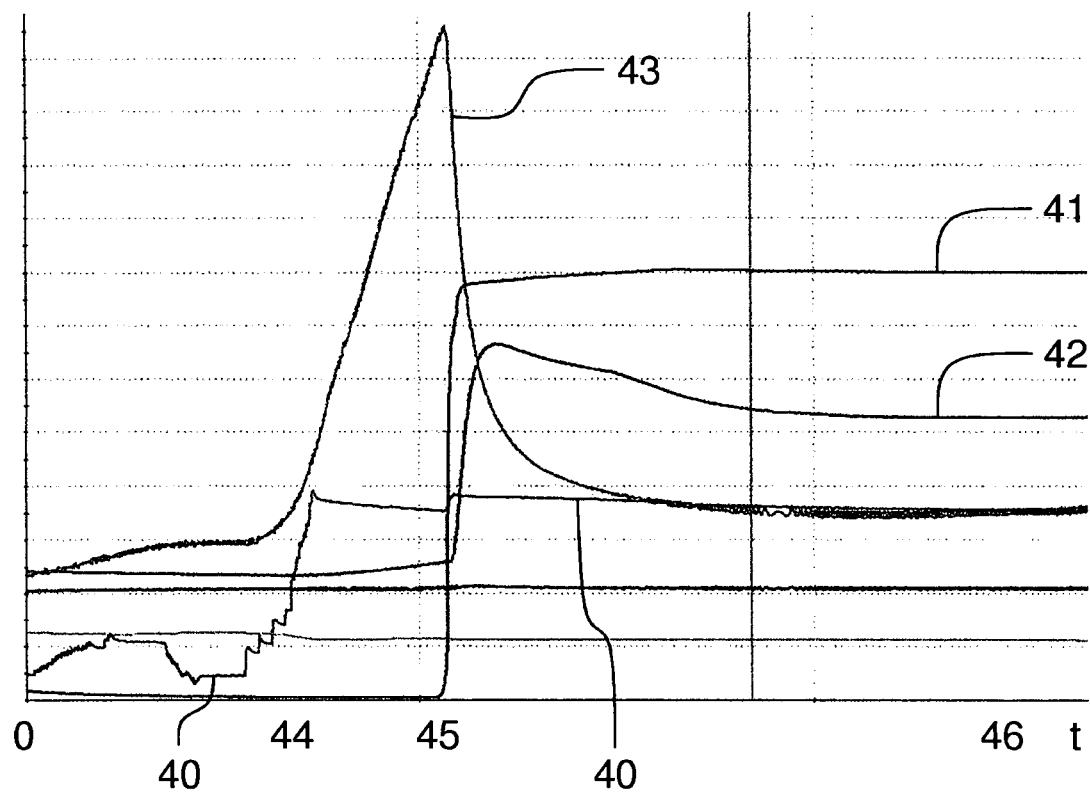
FIG. 23 a diagram representing key parameters, measured in a time-resolved manner, for an operation of an electromagnetic machine according to the present invention.

FIG. 23 shows a diagram representing key parameters measured in a time-resolved manner for an operation of an electromagnetic machine 20 according to the present invention. The following parameters are plotted on a horizontal time axis: current density 40 in the electrical hollow conductor 1 of the electromagnetic machine 20; pressure 41 of a pump 28 for pumping a coolant through the electromagnetic hollow conductor 1; coolant temperature 42 at an outflow after flowing through the electrical hollow conductor 1; and conductor temperature 43 at a surface of the electrical hollow conductor 1. At a first point in time 44, the electromagnetic machine 20 is started and the pump 28 is still turned off. The conductor temperature 43 increases greatly between the first point in time 44 and a second point in time 45 because the flowing current heats the electrical hollow conductor 1, which is not being actively cooled, hence the heat removal is insufficient. At the second point in time 45, the electromagnetic machine 20 continues to operate and the pump 28 is turned on. This leads to an abrupt increase in the pressure 41. The coolant temperature 42 increases between the second point in time 45 and a third point in time 46.

Conversely, the conductor temperature 43 drops rapidly because the heat is now being actively and adequately removed by means of the coolant. From the third point in time 46 onwards, an equilibrium state that is suitable for continuous operation is reached for the operation of the electromagnetic machine 20. In the equilibrium state, the critical parameters are as follows: the current density 40 is 36 A/mm$^2$; the coolant temperature 42 is 53° C.; and the conductor temperature 43 is 36° C.

LIST OF REFERENCE SIGNS

1 Electrical hollow conductor
2 Body
3 Interior
4 Layer
10 Connecting piece
11 Housing
12 Interior
13 Hollow conductor opening
14 Coolant line opening
15 Contact element
16 Separator element
17 Male part
18 Female part
19 Housing insert
20 Electromagnetic machine
21 Magnet unit
22 Conductor unit
24 First phase
25 Second phase
26 Third phase
27 Anchor head
28 Pump
29 Heat exchanger
30 Neutral zone
31 Induction-active segment
32 Induction-passive segment
40 Current density
41 Pressure
42 Coolant temperature
43 Conductor temperature
44 First point in time
45 Second point in time
46 Third point in time
N North pole
S South pole

The invention claimed is:

1. An electromagnetic machine, comprising a magnet unit and a conductor unit electromagnetically interacting with the magnet unit, wherein the conductor unit has at least one electrical conductor, wherein the electrical conductor is in the shape of a tubular body having a hollow interior, wherein the body comprises an electrically conductive material, has an outside diameter and an inside diameter, and is coated with an electrically insulating layer on an outer casing surface of the body, wherein a ratio of the outside diameter to the inside diameter is in a range of 1.25:1 to 4:1, wherein the electrical conductor is wound into a coil, the body is configured as a cylindrical tube, and the outside diameter of the body is in a range of 1.0 mm to 3.2 mm, and wherein the electromagnetic machine further comprises a connecting piece for connecting the electrical conductor and a coolant line, the connecting piece comprising a leak-proof housing having a hollow interior, at least one hollow conductor opening in the housing for receiving an open end of the electrical conductor, and a coolant line opening in the housing for receiving an open end of the coolant line, wherein the hollow interior of the housing is configured so that the hollow interior hydraulically or pneumatically connects the hollow conductor opening and the coolant line opening, wherein the hollow conductor opening has a diameter that is adapted to an outside diameter of a body of the electrical conductor to be received.

2. The electromagnetic machine according to claim 1, wherein the electromagnetic machine has a cooling unit, wherein the cooling unit comprises a pump and the electrical conductor, wherein the pump is configured to pump a coolant through the electrical conductor.

3. The electromagnetic machine according to claim 1, wherein the connecting piece has a housing insert, wherein the housing insert is configured to pass through the housing and wherein a hollow interior of the housing insert provides the hollow conductor opening.

4. The electromagnetic machine according to claim 1, wherein the hollow interior is configured as rounded.

5. The electromagnetic machine according to claim 1, wherein the connecting piece is configured to connect at least two electrical hollow conductors and the coolant line, wherein the connecting piece comprises at least two hollow conductor openings in the housing for receiving open ends of the electrical conductors, wherein the hollow interior is configured so that the hollow interior hydraulically or pneumatically connects the hollow conductor openings and the coolant line opening, wherein the connecting piece has an electrically conductive contact element and an electrically insulating separator element, wherein the contact element is configured so that the contact element electrically connects at least two hollow conductor openings, and wherein the separator element is arranged in an electrically insulating manner between the contact element and the hollow conductor openings on the one hand and the coolant line opening on the other hand.

6. The electromagnetic machine according to claim 1, wherein the contact element is the housing and that the separator element is configured as an electrically insulating sleeve passing through the housing, wherein a hollow interior of the electrically insulating sleeve provides the coolant line opening.

7. The electromagnetic machine according to claim 6, wherein a first group of electrically connected hollow conductor openings is electrically insulated by means of the separator element or by means of another separator element from a second group of electrically connected hollow conductor openings.

* * * * *